United States Patent
Baek et al.

(10) Patent No.: US 8,978,082 B2
(45) Date of Patent: Mar. 10, 2015

(54) METHOD OF SWITCHING DIGITAL TV APPLICATION

(75) Inventors: Wonjang Baek, Seongnam-si (KR); John Kim, Seoul (KR); Seong Baek Lee, Seoul (KR)

(73) Assignee: SK Planet Co., Ltd., Seoul (KR)

( * ) Notice: Subject to any disclaimer, the term of this patent is extended or adjusted under 35 U.S.C. 154(b) by 909 days.

(21) Appl. No.: 12/450,066

(22) PCT Filed: Mar. 21, 2008

(86) PCT No.: PCT/KR2008/001616
§ 371 (c)(1),
(2), (4) Date: Sep. 10, 2009

(87) PCT Pub. No.: WO2008/115031
PCT Pub. Date: Sep. 25, 2008

(65) Prior Publication Data
US 2010/0043043 A1    Feb. 18, 2010

(30) Foreign Application Priority Data
Mar. 22, 2007  (KR) ................. 10-2007-0027893

(51) Int. Cl.
| H04N 7/10 | (2006.01) |
| H04N 7/025 | (2006.01) |
| H04N 5/445 | (2011.01) |
| H04N 7/173 | (2011.01) |
| G06F 3/00 | (2006.01) |
| G06F 13/00 | (2006.01) |
| H04N 21/438 | (2011.01) |

(52) U.S. Cl.
CPC .................. *H04N 21/4384* (2013.01)
USPC ............. 725/109; 725/32; 725/110; 725/112; 725/116

(58) Field of Classification Search
None
See application file for complete search history.

(56) References Cited

U.S. PATENT DOCUMENTS

| 7,216,170 | B2 * | 5/2007 | Ludvig et al. ............. 709/225 |
| 7,984,468 | B2 * | 7/2011 | Westberg ................... 725/46 |
| 2002/0092017 | A1 * | 7/2002 | Klosterman et al. ........ 725/35 |
| 2003/0217369 | A1 * | 11/2003 | Heredia .................. 725/152 |
| 2004/0078829 | A1 * | 4/2004 | Patel et al. ............... 725/135 |
| 2005/0028206 | A1 * | 2/2005 | Cameron et al. ............ 725/46 |
| 2007/0022434 | A1 * | 1/2007 | Oh ......................... 725/32 |
| 2010/0180295 | A1 * | 7/2010 | Ratsch et al. .............. 725/34 |
| 2011/0219419 | A1 * | 9/2011 | Reisman .................. 725/112 |

FOREIGN PATENT DOCUMENTS

| CN | 1452399 A | 10/2003 |
| JP | 2001-243190 A | 9/2001 |

(Continued)

OTHER PUBLICATIONS

Korean Notice of Allowance issued Jun. 13, 2008, issued to corresponding Korean Application No. 10-2007-0027893.

(Continued)

*Primary Examiner* — Nasser Goodarzi
*Assistant Examiner* — Fred Peng
(74) *Attorney, Agent, or Firm* — Stein IP, LLC

(57) ABSTRACT

A method of switching a digital TV application is disclosed. In accordance with the method of the present invention, a channel changing event corresponding to a changing of a channel is used to minimize a time required for providing the digital TV application suitable for a changed channel.

15 Claims, 1 Drawing Sheet

(56) References Cited

FOREIGN PATENT DOCUMENTS

| | | |
|---|---|---|
| KR | 10-0513289 B1 | 9/2005 |
| KR | 10-2006-0126291 A | 12/2006 |
| KR | 10-2007-0023134 A | 2/2007 |

OTHER PUBLICATIONS

Chinese Office Action issued Aug. 23, 2011, issued to corresponding Chinese Application No. 200880013105.3.
Chinese Office Action issued Jun. 19, 2012, issued to corresponding Chinese Application No. 200880013105.3.

* cited by examiner

METHOD OF SWITCHING DIGITAL TV APPLICATION

This is a National Phase Application filed under 35 USC 371 of International Application No. PCT/KR2008/001616, filed on Mar. 21, 2008, which claims foreign priority benefit under 35 USC 119 of Korean Application No. 10-2007-0027893, filed on Mar. 22, 2007, the entire content of each of which is hereby incorporated herein by reference in its entirety.

TECHNICAL FIELD

The present invention relates to a method of switching a digital TV application, and more particularly to a method of switching a digital TV application that minimizes a time required for providing a digital TV application.

BACKGROUND ART

An environment of a broadcasting is changing as a technology progresses and a demand of a viewer changes. Recently, an analog broadcasting is switched to a digital broadcasting, and a broadcast medium is diversified from a terrestrial broadcasting to a cable broadcasting, a satellite broadcasting and an IP-TV service using a high speed communication network.

The digital broadcast is capable of providing additional services in various filed such as sports, movies, home shoppings and musics because a capacity thereof is four to eight times that of the analog broadcasting. A wide variety of choices for the viewer is also provided since various types of the broadcasting such as the cable broadcasting, the satellite broadcasting, a DMB (Digital Multimedia Broadcasting) and the IP-TV are possible.

In addition, under a digital broadcasting environment, a digital TV application may be transmitted as well as a conventional TV program signal, and an interactivity may be embodied by associating with a communication network. Various data services using the digital TV application is expected to play an important role in spreading the digital broadcasting since a viewer may easily use the digital TV application.

However, the provision of the digital TV application in accordance with an conventional art wherein the digital TV application is transmitted to a receiver via a broadcasting network and the receiver executes the digital TV application to be provided to the viewer has following drawbacks.

A head-end system is a system of a digital broadcasting provider for transmitting the TV program signal including audio/video data and the digital TV application to the receiver via the broadcasting network.

Herein, the broadcasting network refers to various broadcasting networks such as a terrestrial broadcasting network, a cable broadcasting network, a satellite broadcasting network, an IP-TV service using the high speed communication network, and a DMB network.

The receiver decodes the broadcast program signal and the digital TV application received from the head-end system to be provided to the viewer. For instance, the receiver may be a digital TV or a set-top box in compliance with the terrestrial broadcasting specification such as the ATSC and interactive data broadcasting specification such as DASE in case of a terrestrial digital broadcasting. The receiver may be a set-top box supporting the broadcasting specification such as Open-Cable and DVB and a data broadcasting specification suitable for the broadcasting network such as OCAP and MHP in case of the cable broadcasting or the satellite broadcasting. The receiver may be a set-top box or a mobile communication terminal supporting a corresponding data broadcasting specification in case of the IP-TV or the DMB.

The receiver may be embodied in a form of the set-top box, the television or a display device. In case of the set-top box, the receiver is connected to the display device to provide the digital broadcasting. In case of the DMB, the receiver may be is built into the mobile communication terminal or an independent DMB receiver. The receiver may be embodied in a form of a PC peripheral when the digital broadcasting is received by a personal computer. When the digital broadcasting is received by the personal computer, the digital broadcasting may be provided on a monitor connected to the personal computer.

However, when the digital TV application is transmitted via the broadcasting network, the digital TV application for a plurality of broadcasting channels are transmitted to the receiver.

For instance, the digital TV application is generally transmitted using a DSM-CC data/object carousel in the terrestrial broadcasting. In addition, the digital TV application is transmitted using an IP multicast scheme in the IP-TV.

Therefore, a number of the digital TV application is limited, and a size and a configuration the digital TV application are also limited.

For instance, a size of a data of the digital TV application corresponding to an HD broadcasting is larger than that of an SD broadcasting.

Therefore, the digital TV application corresponding to the HD broadcasting requires a large bandwidth for transmission, and the number of the digital TV application that can be transmitted via the broadcasting network is smaller than that of the SD broadcasting. In addition, a screen configuration or a scene configuration should be minimized such that the digital TV application can be transmitted within the usable bandwidth. Accordingly, various configurations cannot be used for the digital TV application corresponding to the HD broadcasting.

That is, because the digital TV application is transmitted using a limited resource, the number of and the configuration of the digital TV application are limited.

Therefore, a personalized digital TV application cannot be provided for the viewer.

Moreover, a long time is required from selecting of the digital TV application to loading of the digital TV application.

That is, when the head-end system transmits the digital TV application, the head-end system divides the digital TV application into packets having a fixed size similar to the transmission of a conventional TV program packet. The receiver combines the received packets to generate the digital TV application. When the packet is lost during the transmission, the digital TV application cannot be executed for some cases.

A video data included in a digital broadcast program may be reproduced even when a portion of packets is lost by ignoring the lost packets and using other packets. However, the digital TV application cannot be executed when a portion of the packets thereof is lost. Therefore, an entirety of the data application should be re-transmitted, re-received and re-executed when an error occurs.

In addition, when the receiver receives the packet of the digital TV application, the packet should be combined according to a predetermined order, thereby required an additional time for the combination.

Moreover, even after the combination of the packets is complete, the digital TV application cannot be loaded dividedly, and the entirety of the digital TV application should be loaded and executed. Therefore, an execution speed is slow and a resource of the receiver is excessively used.

Due to above-described problems, the time required for receiving, executing and providing the digital TV application is 10 to 30 seconds. Therefore, it is very inconvenient for the viewer.

Particularly, in case of a broadcast network using the communication network such as the IP-TV, a TV program for a channel requested by the receiver and the digital TV application corresponding to the channel are provided to the receiver from the head-end system rather than providing an entirety of the channel and the digital TV application. Such configuration using the communication network may be used for the cable broadcasting, the terrestrial broadcasting, the satellite broadcasting using the return channel and the DMB in order to provide more channels.

In accordance with the configuration, the changing of the channel is notified to the head-end system, and the head-end system extracts the TV program and the digital TV application for the corresponding channel to be transmitted to the receiver. The receiver receives and provides the TV program and the digital TV application.

Therefore, the head-end system should additionally carry out a switching of the TV program and the digital TV application for the corresponding channel to correspond to the changing of the channel.

Because the time for receiving the digital TV application by the receiver and providing the received digital TV application to the viewer to correspond to the changing of the channel includes time for switching in the head-end system, more than 30-40 seconds of time are required to provide the digital TV application in the receiver. Therefore, it is very inconvenient for the viewer.

Moreover, the execution of the digital TV application is limited by a processing capacity or a storage capacity of the receiver.

That is, when a size of the digital TV application is too large, the digital TV application cannot be executed. Therefore, the number of and the configuration of the digital TV application are limited.

Accordingly, a method for minimizing the time required for transceiving and providing the digital TV application is needed.

DISCLOSURE OF INVENTION

Technical Problem

It is an object of the present invention to provide a method for switching a digital TV application that minimizes a time required for providing the digital TV application corresponding to a changing of a channel.

It is another object of the present invention to provide a method for switching a digital TV application wherein the time required for providing the digital TV application is minimized by dividing the digital TV application into a minimum execution data and an additional execution data and receiving and executing only a required data.

It is another object of the present invention to provide a method for switching a digital TV application wherein a limit in a number or a size of the digital TV application is minimized and a personalized digital TV application may be provided based on a device identification information or a user identification information.

Technical Solution

In order to achieve above-described object of the present invention, there is provided a method for switching a digital TV application in a receiver for receiving and providing the digital TV application, the method comprising steps of: (a) receiving a channel changing event corresponding to a channel changing from a first channel to a second channel; (b) generating an application switching event corresponding to the digital TV application suitable for the second channel, the application switching event including at least one of a channel identification information of the second channel, a device identification information of the receiver and a user identification information of a user of the receiver; (c) transmitting the application switching event to an application providing server for providing the digital TV application; and (d) receiving and executing the digital TV application corresponding to the application switching event.

Preferably, the step (a) comprises (a-1) receiving the channel changing event including the channel identification information of the second channel.

Preferably, the step (d) comprises: (d-1) receiving a minimum execution data required for executing the digital TV application from the application providing server; and (d-2) executing the minimum execution data.

Preferably, the minimum execution data includes at least one of an executable code, a display data and a resource data for an initial screen of the digital TV application.

Preferably, the step (d) comprises: (d-3) requesting an additional execution data required during the execution of the minimum execution data to the application providing server; (d-4) receiving the additional execution data from the application providing server; and (d-5) executing the additional execution data.

Preferably, the additional execution data includes at least one of an executable code, a display data and a resource data for a screen to be displayed corresponding to a user input during the execution of the digital TV application based on the minimum execution data.

There is also provided a method for switching a digital TV application in an application providing server for providing the digital TV application, the method comprising steps of: (a) receiving, from a receiver executing and providing the digital TV application, an application switching event including at least one of a channel identification information of a channel, a device identification information of the receiver and a user identification information of a user of the receiver; and (b) extracting and transmitting the digital TV application based on the application switching event to the receiver.

Preferably, the step (b) comprises (b-1) extracting the digital TV application to be provided to the receiver based on at least one of the channel identification information, the device identification information and the user identification information.

Preferably, the method in accordance with the present invention further comprises (c) dividing the digital TV application into a minimum execution data and an additional execution data and storing the minimum execution data and the additional execution data prior to carrying out the step (a).

Preferably, the step (b) comprises: (b-2) extracting the minimum execution data for the digital TV application to be provided to the receiver based on the application switching event; and (b-3) transmitting the minimum execution data to the receiver.

Preferably, the minimum execution data includes at least one of an executable code, a display data and a resource data for an initial screen of the digital TV application.

Preferably, the step (b) comprises: (b-4) receiving a transmission request for the additional execution data required during an execution of the minimum execution data from the receiver; and (b-5) extracting and transmitting the additional execution data to the receiver.

Preferably, the additional execution data includes at least one of an executable code, a display data and a resource data for a screen to be displayed corresponding to a user input during the execution of the digital TV application based on the minimum execution data.

Preferably, dividing each of a plurality if the digital TV applications into a minimum execution data and an additional execution data and storing the minimum execution data and the additional execution data prior to carrying out the step (a).

Preferably, the step (b) comprises: (b-6) extracting the minimum execution data corresponding to the digital TV application to be provided to the receiver from the plurality of the digital TV applications based on the application switching event; and (b-7) transmitting the extracted minimum execution data to the receiver.

Preferably, the minimum execution data includes at least one of an executable code, a display data and a resource data for an initial screen of the digital TV application.

Preferably, the step (b) comprises: (b-8) receiving a transmission request for the additional execution data required during an execution of the minimum execution data from the receiver; and (b-9) extracting and transmitting the additional execution data corresponding to the transmission request to the receiver.

Preferably, the additional execution data transmitted in the step (b-9) includes at least one of an executable code, a display data and a resource data for a screen to be displayed corresponding to a user input during the execution of the digital TV application corresponding to the minimum execution data transmitted in the step (b-7).

Advantageous Effects

As described above, the time required for providing the digital TV application corresponding to the changing of the channel is minimizes in accordance with the present invention.

In addition, the time required for providing the digital TV application is minimized by dividing the digital TV application into the minimum execution data and the additional execution data and receiving and executing only the required data.

Moreover, the limit in the number of or the size of the digital TV application is minimized.

The personalized digital TV application may be provided based on the device identification information or the user identification information.

BEST MODE FOR CARRYING OUT THE INVENTION

A method for switching a digital TV application in accordance with the present invention will now be described in detail with reference to the accompanied drawings.

Figure 1:
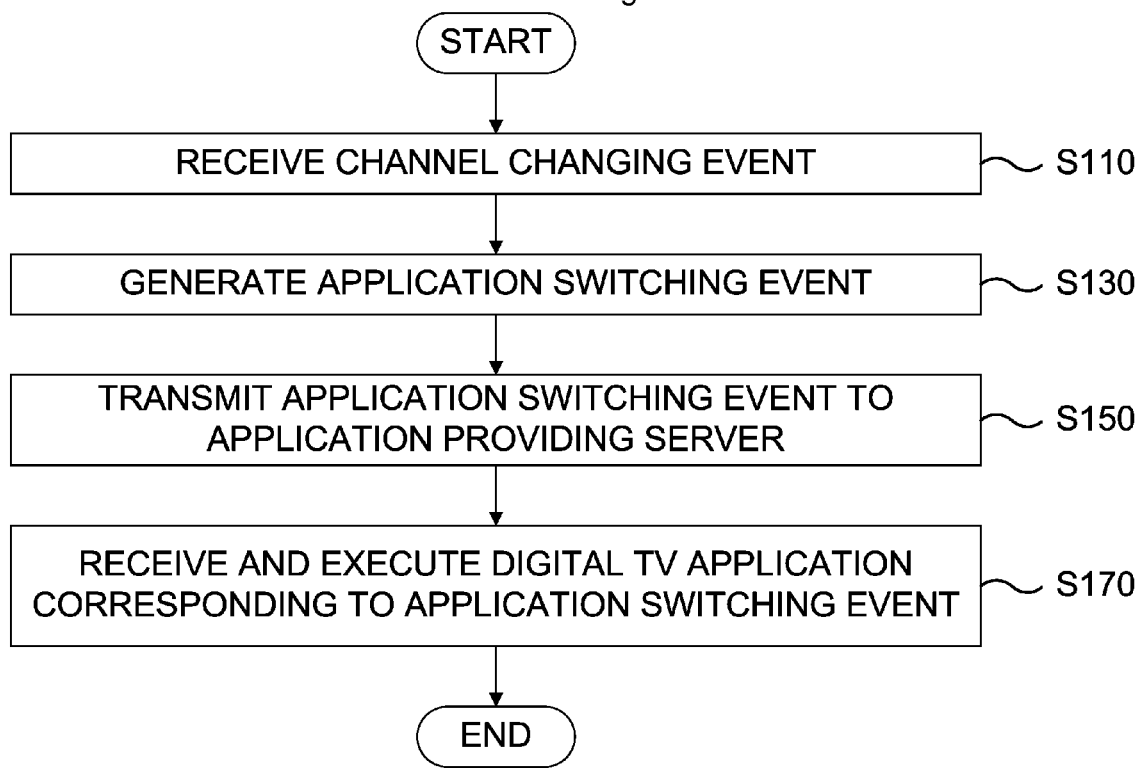
FIG. 1 is a flow diagram exemplifying a method for switching a digital TV application in accordance with the present invention.

FIG. 1 is a flow diagram exemplifying a method for switching a digital TV application in accordance with the present invention wherein the method is embodied in a receiver for receiving and executing the digital TV application.

Referring to FIG. 1, a channel changing event is received (S110).

The channel changing event is generated when a viewer or a user changes a first channel to a second channel while watching the first channel. When the channel changing event is generated, the receiver receives the digital TV application for the second channel and provides the received digital TV application to the user.

For instance, the channel changing event is generated when the user changes the channel using a remote controller, and the receiver receives the channel changing event from the remote controller.

The channel changing event includes a channel identification information of the changed channel, i.e. the second channel.

The channel identification information of the second channel may be a channel number of the second channel wherein the channel number may include a physical channel number or a logical channel number. Alternately, the channel number may be represented in a form of a packet ID.

When the channel changing event is received in the step S110, the receiver generates an application switching event in order to receive the digital TV application suitable for the second channel (S130).

The application switching event may include at least one of the channel identification information of the second channel, a device identification information of the receiver and a user identification information of the receiver.

The channel identification information of the second channel may be used to received the digital TV application suitable for the second channel.

The device identification information and the user identification information may be used to receive the digital TV application suitable for the receiver and the user, respectively.

That is, the device identification information or the user identification information of the receiver may be used as a basic data for providing a personalized digital TV application when a server providing the digital TV application extracts the digital TV application to be transmitted to the receiver.

Thereafter, the application switching event generated in the step S130 is transmitted to an application providing server that provides the digital TV application (S150).

The application providing server stores the digital TV application corresponding to each channel. In addition, the application providing server provides the digital TV application corresponding to the application switching event according to a request of the receiver.

The application providing server may store the digital TV application according to a predetermined profile as well as the digital TV application according to the channel, and transmit the digital TV application corresponding to the device identification information or the user identification information received form the receiver according to the request of the receiver.

The application switching event is transmitted to the application providing server via a return channel.

Preferably, the return channel may include a high speed communication network such as VDSL and FTTH.

The application switching event is transmitted to the application providing server rather than to the head-end system.

The head-end system requires a longer switching time and a transmission scheme thereof is not suitable for the digital TV application. Thus, the application switching event is transmitted to the application providing server that is capable of a fast switching and transmitting the digital TV application in high speed using the return channel.

The time required for switching and receiving the digital TV application is minimized through the steps S150 and S170.

Thereafter, the receiver receives and executes the digital TV application corresponding to the application switching event (S170).

The digital TV application may be executed when an entirety of the digital TV application is received similar to the conventional art.

However, a number, the size, and the configuration of the provided digital TV application may be limited.

Therefore, it is preferable that the digital TV application is received and provided as describe below.

Firstly, the digital TV application is divided into a minimum execution data and an additional execution data, the application providing server may transmit the minimum execution data and the additional execution data, and the receiver receives and executes the minimum execution data and the additional execution data separately.

The minimum execution data may include at least one of an executable code, a display data and a resource data for an initial screen of the digital TV application. The additional execution data may include at least one of an executable code, a display data and a resource data for a screen to be displayed corresponding to a user input during the execution of the digital TV application based on the minimum execution data.

The executable code is an independently executable code to correspond to a scene. That is, the executable code is independently executable for each scene contrary to that of the conventional art that is executable for the entirety of the digital TV application. Therefore, the executable code is required for each scene of the digital TV application.

The display data is an element displayed on a screen when a mobile application is executed wherein a plurality of scenes corresponding to the user input are divided and stored according to the user input for each scene.

The resource data refers to a data that may be additionally displayed such as a control box, a text box and an image other than the display data.

In accordance with the prior art, the entirety of the digital TV application is stored for an entirety of scenes. In addition, the receiver receives and executes the entirety of the digital TV application.

However, in accordance with the present invention, the application providing server divides and stores the digital TV application for each scene. That is, the application providing server divides and stores the digital TV application into the minimum execution data and the additional execution data in advance so as to include the executable code for the initial screen and other screen, a display data constituting the screen and the resource data including the image. Thereafter, the application providing server transmits the minimum execution data or the additional execution data according to the request of the receiver, and the receiver executes the minimum execution data or the additional execution data to provide the digital TV application.

The key feature of the present invention is referred to as a "scene-by-scene loading".

Loading and executing the digital TV application divided into the minimum execution data and the additional execution data are described below in detail.

The receiver receives and executes the minimum execution data required for executing the digital TV application from the application providing server.

The minimum execution data includes at least one of an executable code, a display data and a resource data for the initial screen, i.e. a screen that is provided first when the digital TV application is executed.

Thereafter, the receiver requests the additional execution data required during the execution of the minimum execution data to the application providing server. The receiver then receives and executes the additional execution data from the application providing server.

That is, after the receiver provides the initial screen through the minimum execution data, a data for a second scene (or a second screen), i.e. the additional execution data is received and executed.

When the digital TV application divided into the minimum execution data and the additional execution data is loaded scene-by-scene, the limitation of the number, the size and the configuration of the digital TV application that may be provide by the digital broadcasting system may be minimized.

In accordance with the conventional method for providing the digital TV application, because the digital TV application generated to include an entirety of the scene is transmitted from the head-end system to the receiver and the receiver receives and executes the same, a bandwidth or a resource of the receiver is not efficiently utilized.

However, in accordance with the present invention, because the digital TV application is divided into the minimum execution data and the additional execution data and only the required data is received and provided through scene-by-scene loading, the bandwidth or the resource of the receiver is efficiently utilized even for the digital TV application in the HD broadcasting.

In addition, the transmission of the digital TV application between the application providing server and the receiver is carried out through the return channel.

Therefore, a limit of the bandwidth due to the transmission of the digital TV application may be minimized when the high speed communication network such as the VDSL and the FTTH is used.

[Mode for the Invention]

Figure 2:
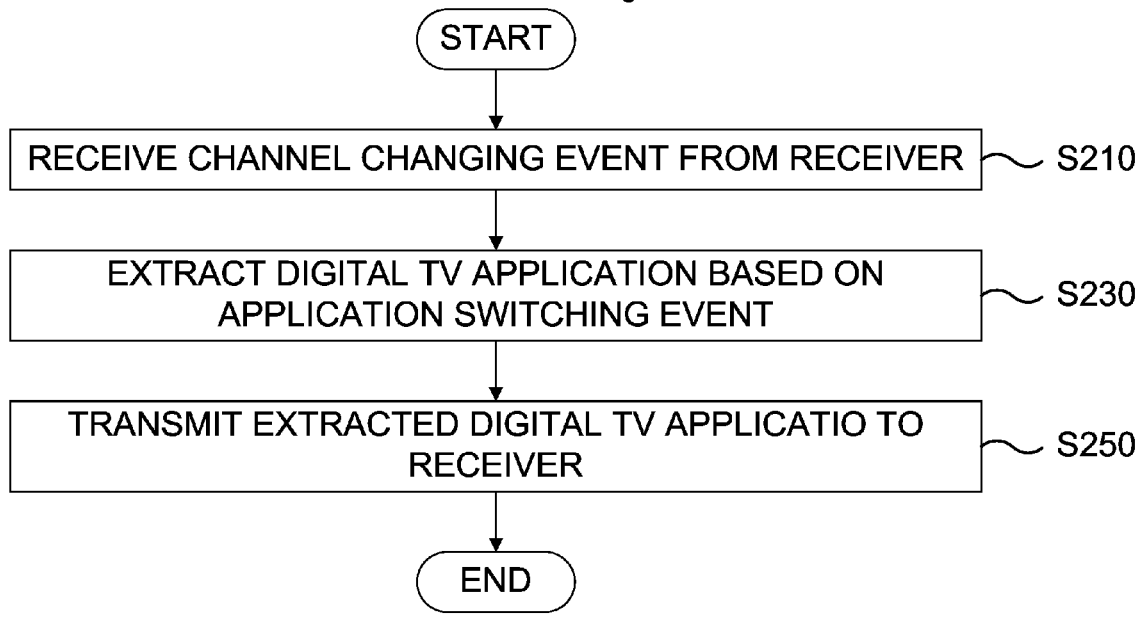
FIG. 2 is a flow diagram exemplifying another method for switching a digital TV application in accordance with the present invention.

FIG. 2 is a flow diagram exemplifying another method for switching a digital TV application in accordance with the present invention wherein the method is embodied in the application providing server providing the digital TV application according to the request of the receiver.

Referring to FIG. 2, the application switching event is received from the receiver that executes and provides the digital TV application (S210).

As described above, the application switching event may include at least one of the channel identification information of the second channel, the device identification information of the receiver and the user identification information of the receiver.

The application switching event is received through the return channel.

Preferably, the return channel may include the high speed communication network such as the VDSL and the FTTH.

Thereafter, the digital TV application to be provided to the receiver is extracted based on the application switching event received in the step S210 (S230).

The process of extracting the digital TV application is described below in detail.

Firstly, the digital TV application suitable for the second channel is extracted based on the channel identification information of the second channel.

That is, the application providing server configures, in advance, the digital TV application for each channel in a form of a from-to table based on a channel information for instance. Thereafter, the application providing server extracts the digital TV application corresponding to the channel identification information of the second channel by referring to the from-to table.

In addition, the application providing server may extract the personalized digital TV application based on the device identification information or the user identification information of the receiver suitable for the receiver or the viewer.

That is, the application providing server configures the digital TV application that is to be provided according to the device identification information or the user identification information in the form of the from-to table based on a profile. Thereafter, the application providing server extracts the digital TV application corresponding to a certain device identification information or a certain user identification information by referring to the from-to table.

The digital TV application is extracted according to above-described process.

Thereafter, the digital TV application extracted in the step S230 is transmitted to the receiver (S250).

The application providing server may transmit the digital TV application to the receiver via the return channel.

Preferably, the return channel may include the high speed communication network such as the VDSL and the FTTH.

On the other hand, the extraction and the transmission of the digital TV application in the step S230 and S250 may be carried out similar to the conventional art wherein the entirety of the digital TV application is extracted and transmitted.

However, the number, the size, and the configuration of the digital TV application may be limited.

Therefore, it is preferable that the digital TV application is extracted and transmitted as describe below.

Firstly, the digital TV application is divided into the minimum execution data and the additional execution data. The application providing server transmits each of the minimum execution data and the additional execution data to the receiver, and the receiver receives and executes each of the minimum execution data and the additional execution data.

The minimum execution data and the additional execution data are identical to the minimum execution data and the additional execution data described with reference to FIG. 1.

That is, the application providing server stores the digital TV application by dividing into the minimum execution data and the additional execution data in advance prior to carrying out the step S210.

Thereafter, when the application switching event is received (S210), the application providing server extracts the minimum execution data corresponding to the digital TV application that is to be provided to the receiver (S230).

When the extraction of the minimum execution data is complete, the application providing server transmits the minimum execution data to the receiver (S250). The receiver executes the received minimum execution data to be provided to the viewer.

The receiver requests the additional execution data required during the execution of the digital TV application to the application providing server.

When the transmission request of the additional execution data is received, the application providing server extracts the requested additional execution data (S230). Thereafter, the application providing server transmits the extracted additional execution data to the receiver (S250). The receiver then receives and executes the additional execution data.

As described above, when the digital TV application divided into the minimum execution data and the additional execution data is loaded scene-by-scene, the limitation of the number, the size and the configuration of the digital TV application that may be provide by the digital broadcasting system may be minimized.

In addition, when a plurality of the digital TV applications exist, the extraction and the transmission of the digital TV application may be carried out as follows.

Prior to carrying out the step S210, the application providing server divides the plurality of the digital TV application into a plurality of the minimum execution data and a plurality of the additional execution data and stores the same in advance. The plurality of the minimum execution data and the plurality of the additional execution data are identical to the minimum execution data and the additional execution data described with reference to FIG. 1.

Thereafter, when the application switching event is received (S210), the application providing server extracts the minimum execution data to be provided to the receiver. That is, the application providing server extracts the minimum execution data that is to be provided to the receiver from the plurality of the minimum execution data.

Thereafter, the application providing server transmits the extracted minimum execution data to the receiver (S250). Thereafter, the receiver executes the minimum execution data transmitted by the application providing server to be provided to the viewer.

Thereafter, the receiver requests the additional execution data required during the execution of the minimum execution data to the application providing server.

The application providing server then extracts the additional execution data requested by the receiver (S230), and transmits the extracted additional execution data to the receiver (S250).

The receiver then executes the additional execution data received from the application providing server.

In accordance with above-described configuration, the additional execution data may be selectively reused for the plurality of the digital TV applications. Therefore, a storage capacity of the application providing server may be maximized.

In accordance with the present invention, the reuse of the digital TV application may be reinforced. For instance, the minimum execution data or the additional execution data representing a same executable code, a same screen or a same resource may be reused without a recreation thereof.

While the present invention has been particularly shown and described with reference to the preferred embodiment thereof, it will be understood by those skilled in the art that various changes in form and details may be effected therein without departing from the spirit and scope of the invention as defined by the appended claims.

INDUSTRIAL APPLICABILITY

As described above, the time required for providing the digital TV application corresponding to the changing of the channel is minimizes in accordance with the present invention.

In addition, the time required for providing the digital TV application is minimized by dividing the digital TV application into the minimum execution data and the additional execution data and receiving and executing only the required data.

Moreover, the limit in the number of or the size of the digital TV application is minimized.

The personalized digital TV application may be provided based on the device identification information or the user identification information.

The invention claimed is:

1. A method for switching a digital TV application in a receiver for receiving and executing the digital TV application, the method comprising steps of:
    (a) receiving a channel changing event corresponding to a channel changing from a first channel to a second channel;
    (b) generating an application switching event corresponding to the digital TV application suitable for the second channel, the application switching event including at least one of a device identification information of the receiver and a user identification information of a user of the receiver;
    (c) transmitting the application switching event to an application providing server rather than a head-end system, wherein the application providing server stores the digital TV application according to a predetermined profile and the digital TV application corresponding to each channel, and wherein the application providing server is not a web server; and
    (d) receiving and executing the digital TV application corresponding to the application switching event from the application providing server, wherein the application providing server transmits the digital TV application corresponding to the device identification information or the user identification information, and wherein the application providing server does not provide a web page,
    wherein the step (d) comprises:
    (d-1) receiving a minimum execution data required for executing the digital TV application from the application providing server; and
    (d-2) executing the minimum execution data.

2. The method in accordance with claim 1, wherein the step (a) comprises (a-1) receiving the channel changing event including the channel identification information of the second channel.

3. The method in accordance with claim 1, wherein the minimum execution data includes at least one of an executable code, a display data and a resource data for an initial screen of the digital TV application.

4. The method in accordance with claim 1, wherein the step (d) comprises:
    (d-3) requesting an additional execution data required during the execution of the minimum execution data to the application providing server;
    (d-4) receiving the additional execution data from the application providing server; and
    (d-5) executing the additional execution data.

5. The method in accordance with claim 4, wherein the additional execution data includes at least one of an executable code, a display data and a resource data for a screen to be displayed corresponding to a user input during the execution of the digital TV application based on the minimum execution data.

6. A method for switching a digital TV application in an application providing server for providing the digital TV application, the method comprising steps of:
    (a) receiving, from a receiver for executing the digital TV application, an application switching event including at least one of a channel identification information of a channel, a device identification information of the receiver and a user identification information of a user of the receiver;
    (b) extracting and transmitting personalized digital TV application based on the application switching event to the receiver, wherein the application providing server configures the personalized digital TV application that is to be provided according to the device identification information or the user identification information in the form of a from-to table based on a profile, and wherein the application providing server is not a web server and does not provide a web page; and
    (c) dividing the another digital TV application into a minimum execution data and an additional execution data and storing the minimum execution data and the additional execution data prior to carrying out the step (a),
    wherein the step (b) comprises:
    (b-2) extracting the minimum execution data for the another digital TV application to be provided to the receiver based on the application switching event; and
    (b-3) transmitting the minimum execution data to the receiver.

7. The method in accordance with claim 6, wherein the step (b) comprises (b-1) extracting the another digital TV application to be provided to the receiver based on at least one of the channel identification information, the device identification information and the user identification information.

8. The method in accordance with claim 6, wherein the minimum execution data includes at least one of an executable code, a display data and a resource data for an initial screen of the digital TV application.

9. The method in accordance with claim 6, wherein the step (b) comprises:
    (b-4) receiving a transmission request for the additional execution data required during an execution of the minimum execution data from the receiver; and
    (b-5) extracting and transmitting the additional execution data to the receiver.

10. The method in accordance with claim 9, wherein the additional execution data includes at least one of an executable code, a display data and a resource data for a screen to be displayed corresponding to a user input during the execution of the digital TV application based on the minimum execution data.

11. The method in accordance with claim 6, wherein dividing each of a plurality of the digital TV applications into a minimum execution data and an additional execution data and storing the minimum execution data and the additional execution data prior to carrying out the step (a).

12. The method in accordance with claim 11, wherein the step (b) comprises:
    (b-6) extracting the minimum execution data corresponding to the another digital TV application to be provided to the receiver from the plurality of the digital TV applications based on the application switching event; and
    (b-7) transmitting the extracted minimum execution data to the receiver.

13. The method in accordance with claim 12, wherein the minimum execution data includes at least one of an executable code, a display data and a resource data for an initial screen of the digital TV application.

14. The method in accordance with claim 12, wherein the step (b) comprises:
    (b-8) receiving a transmission request for the additional execution data required during an execution of the minimum execution data from the receiver; and
    (b-9) extracting and transmitting the additional execution data corresponding to the transmission request to the receiver.

15. The method in accordance with claim 14, wherein the additional execution data transmitted in the step (b-9) includes at least one of an executable code, a display data and a resource data for a screen to be displayed corresponding to a user input during the execution of the digital TV application corresponding to the minimum execution data transmitted in the step (b-7).

* * * * *